June 2, 1970 L. A. MICHAELS ET AL 3,515,949

3-D FLATPACK MODULE PACKAGING TECHNIQUE

Filed Nov. 22, 1967 4 Sheets-Sheet 1

INVENTORS
LEONARD A. MICHAELS
ALBERT M. SULLIVAN, Jr.

BY Ronald J. Kransdorf

United States Patent Office 3,515,949
Patented June 2, 1970

3,515,949
3-D FLATPACK MODULE PACKAGING TECHNIQUE

Leonard A. Michaels, Baltimore, and Albert Manley Sullivan, Jr., Ellicott City, Md., assignors, by mesne assignments, to The Bunker Ramo Corporation, Oak Brook, Ill., a corporation of Delaware Filed Nov. 22, 1967, Ser. No. 685,022
Int. Cl. H05k 7/04
U.S. Cl. 317—101 15 Claims

ABSTRACT OF THE DISCLOSURE

A module for packaging flat electronic circuit elements such as flatpacks which includes two circuit boards each of which has a matrix of plated-through holes which boards are positioned parallel to each other and are spaced apart by a predetermined distance. Printed circuit wiring interconnecting selected holes appears on at least one side of each of the boards. A plurality of flatpacks or similar wafer-like circuit elements are arranged in an array between the boards with each lead of a flatpack projecting through a corresponding hole on a circuit board. The leads are physically and electrically secured to the plated-through material of the boards by soldering or a similar technique. Passive or other flat circuit elements may be interspersed between the flatpacks and the entire module may be encapsulated and/or covered with a layer of shielding material. The individual modules may be arranged as building blocks to form a larger circuit.

This invention relates to a packaging array for flat electronic circuit elements and to a method for fabricating such an array. The invention herein described was made in the course of or under a contract or subcontract thereunder with an agency of the United States Government.

Miniature and micro-miniature electronic circuit elements of the monolithic, thin film, thick film and related types are frequently packaged in a wafer-like capsule. These wafers have electrical leads or pins projecting from two opposite edges thereof and are generally referred to as "flatpacks." While a single flatpack is usually capable of performing a particular logic function, it is generally necessary to interconnect a number of flatpacks in order to construct any sort of a practical circuit. Therefore, the size of the ultimate circuit is determined as much by the manner in which the flatpacks are arranged and interconnected as by the size of the flatpacks themselves.

Flatpack circuit packages which have heretofore been utilized have placed the flatpacks, one face down, in a predetermined array on a laminated printed circuit board. The leads of the flatpacks are then interconnected by running printed circuit wiring across the face of the board. Where wire cross-overs occur, one of the wires is connected to circuit wiring appearing in a lower level of the board. The designing of wiring arrays for these circuits is a fairly complex job and, since many leads are required to pass between each pair of flatpacks, the spacing between flatpacks must be relatively great. As a result, the flatpack packing factor in circuit arrays of this type is relatively low.

Existing flatpack arrays suffer from other deficiencies as well. The multi-layer printed circuit boards are expensive and the difficulty and complexity of laying out the wiring patterns on a board having a fairly large number of flatpacks adds to the cost. The complexity of laying out the circuits and the fact that several people are required to get involved in the act between the engineer who designs the circuit and the man who makes the final tape layout, increases the likelihood of errors being introduced into the circuit design. This tends to reduce the reliability of the circuit. The size of the array means that there will be some relatively long printed circuit wires running between flatpack leads. This reduces the potential speed of the ultimate circuit and also increases the likelihood of cross-talk between wires. The cost of the boards also makes it uneconomical to dispose of a board when a defect develops in one of the flatpacks or other components. Repairing a board is, however, a time consuming and difficult process. It would, therefore, be desirable if the arrays could be constructed cheaply enough so that a module thereof could be economically disposed of when a flatpack or other element goes bad. Finally, the flexibility of packaging design is somewhat restricted by the size and shape of the standard printed circuit boards. It would be desirable if the flatpacks could be packaged in building block modules which could be arranged in any desired configuration.

It is therefore a primary object of this invention to provide an improved packaging array for flat, wafer-like, electronic circuit elements such as flatpacks.

A more specific object of this invention is to provide a packaging array for flatpacks or similar circuit elements which array has an extremely high packing factor.

Another object of this invention is to provide a packaging array of the type described above which is considerably simpler to design and fabricate and is therefore cheaper and more reliable.

Still another object of this invention is to reduce the cost of flatpack packaging arrays by eliminating the need for multi-layer printed circuit boards.

A further object of this invention is to provide a packaging array for flatpacks or similar electronic circuit elements which minimizes the length of the interconnecting wiring thereby improving the speed of the circuit and reducing crosstalk.

A still further object of the invention is to provide a packaging array of the type described above which is formed of relatively inexpensive modular building blocks which are cheap enough so that they may be thrown away when a defect develops and which are adapted to be arranged in a great variety of configurations.

Another object of this invention is to provide a packaging array of the type described above which may be easily encapsulated or shielded to permit operation under various adverse conditions.

In accordance with these objects, this invention provides an electronic circuit array each module of which has two boards which are positioned parallel to each other and spaced apart by a distance slightly greater than the width of a flatpack. Each board has a matrix of holes formed therein, the holes being spaced, in at least one dimension, by a distance substantially the same as that between flatpack pins. Each of the holes has electrically conducting material plated therethrough and the plated-through material of the holes is interconnected on at least one side of each board in a predetermined circuit pattern. In a preferred embodiment of the invention there is interconnecting wiring on both sides of the board thus alleviating to some extent the cross-over problem. A plurality of flat electronic circuit elements such as flatpacks are positioned between the boards with each pin of each element passing through a single hole in the adjacent board. The flatpacks are stacked with their flat faces parallel to each other in at least one array between the boards. Passive printed circuit elements suitable for interconnecting the circuitry on the two boards may be positioned between selected flatpacks or shielding elements may be placed between flatpacks. Small boards having discrete circuit components may also be placed in the array between selected flatpacks. The pins projecting through each hole are physically and electrically connected to the conducting material plated through the hole by, for example, soldering the pin to the plated-through material. The entire array, including the boards, may be encapsulated and/or shielding material may be placed over the entire array. The individual arrays may be used as building blocks to form a larger circuit array having any desired physical configuration.

The foregoing and other objects, features and advantages of the invention will be apparent from the following more particular description of preferred embodiments of the invention, as illustrated in the accompanying drawings.

Figure 2:
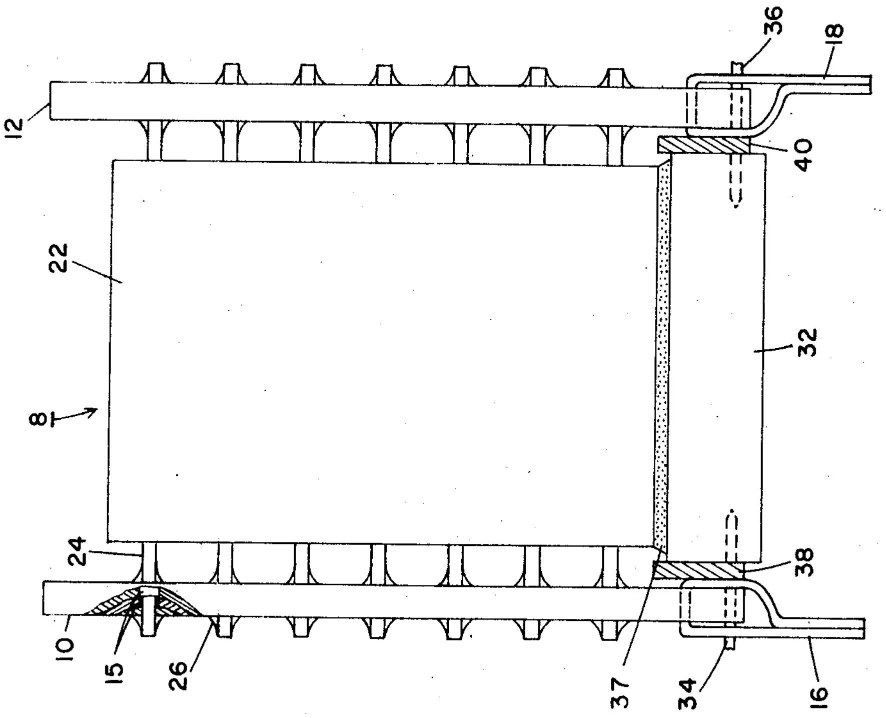
FIG. 2 is a partially broken away front view of the packaging array shown in FIG. 1.
Figure 1:
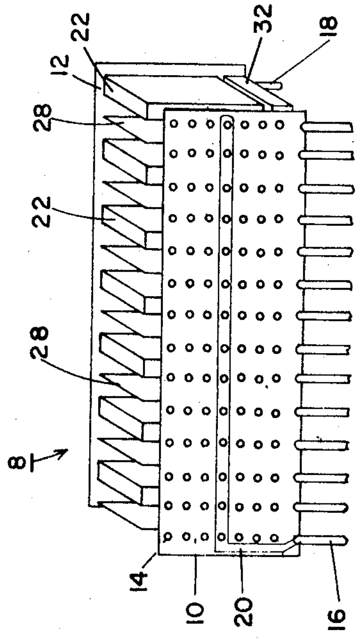
FIG. 1 is a perspective view of a packaging array module of the preferred embodiment of the invention.

Referring now to FIGS. 1 and 2, it is seen that a single module 8 of the packaging array consists of two circuit boards 10 and 12, which boards will hereinafter be referred to as "siderails." Each siderail has a matrix of holes 14 formed therein each of the holes 14 having an electrically conducting material 14 (see FIG. 2) plated therethrough. An example of a suitable material for the siderails would be an epoxy glass double clad one half ounce copper material with tin/nickel plated-through holes. The holes may be plated using either a pattern-plated process or a panel-plated approach. For the particular application, the pattern-plated process has been found to be superior. A header pin 16 is secured to board 10 at the base of each column of holes. As may be best seen in FIG. 2, each header pin 16 is formed by passing a wire through the bottom-most hole in board 10 and folding the wire back upon itself. Header pins 18 may also be connected along the lower edge of board 12. As will be seen shortly, pins 16 and 18 may be utilized to connect module 8 to a larger circuit array. Selected holes 14 on circuit board 10 are interconnected by printed circuit wiring 20. A wire 20 may interconnect holes only or may connect holes to a header pin as shown in FIG. 1. Printed circuit wiring 20 may appear on both sides of boards 10 and 12 with the wiring on one side of the board being connected to the wiring on the other side of the board by the conducting material 15 in one or more of the plated-through holes.

A plurality of flatpacks 22 are suspended between boards 10 and 12. In the drawings the flatpacks are of the 14 pin digital logic micro-circuit type. Other flatpacks could, of course, be utilized with suitable changes in the board geometry. The spacing between pins for the flatpacks of the preferred embodiment of the invention is 0.050 inch and the vertical spacing between holes on boards 10 and 12 is therefore also 0.050 inch. As may be best seen in FIG. 2, the pins 24 of each flatpack project through corresponding holes 14 in circuit boards 10 and 12 are clipped, leaving a short lead projection beyond the edge of the board. As will be seen later, there is also a predetermined spacing between each of the boards and the flatpack. The flatpacks are physically and electrically connected to the boards by soldering each of the leads with solder fillet 26 to the plated-through electrically conducting material 15 of the corresponding hole.

Figure 3:
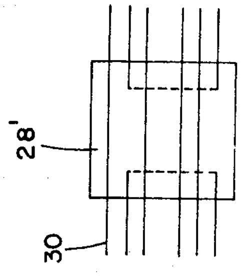
FIG. 3 is a diagram of a universal interconnect wafer suitable for use in the array shown in FIG. 1.

With a configuration of the type shown in FIG. 1, the only way to run a wire from circuit board 10 to circuit board 12 is through one of the flatpacks. This is not a desirable situation. In order to alleviate this problem, a plurality of additional elements 28, which, for the present discussion may be assumed to be universal interconnect wafers 28', have been provided. While in FIG. 1 the wafers have been shown interspersed between each flatpack 22, this is in no way a limitation on the invention. As may be seen better in FIG. 3, each interconnect wafer 28' has twelve pins 30, six on each side, which provide four paths between circuit boards and one path on each side between a pin 30 near the top of the wafer and a pin 30 near the bottom. The wires running through wafers 28' are on one side of the wafer and the wires running from the top to the bottom are on the other side. The wires running from the top to the bottom of the wafer are useful for cross-overs. Wafers 28' are mounted and secured to circuit boards 10 and 12 in a manner identical to that for flatpacks 22, the only difference being that there is no middle pin 30 corresponding to the middle pin 24 of the flatpacks.

While in the preferred embodiment of the invention it is assumed that the additional elements 28 are universal interconnect wafers 28' the additional elements 28 could be utilized to perform other functions. For example, the elements 28 could be constructed of a conductive material, such as copper or silver, and utilized as a shield between flatpacks. In certain applications the wafers 28 could also be printed circuit boards containing discrete components. In either event the wafers would be mounted and secured in a manner substantially identical to that for the flatpacks.

As may be best seen in FIG. 2, a heat-sink plate 32 is mounted between boards 10 and 12 below flatpacks 22. This plate may, for example, be constructed of aluminum and is secured to boards 10 and 12 by pins 34 and 36 respectively. Strips of dielectric material 38 and 40 are provided to electrically insulate heat-sink plate 32 from boards 10 and 12 respectively. These strips prevent the shorting of the siderails to the heat-sink plate. Optimum thermal conduction between flatpacks 22 and heat-sink plate 32 is assured by securing these elements to each other with a layer 37 of thermal adhesive material.

Figure 4:
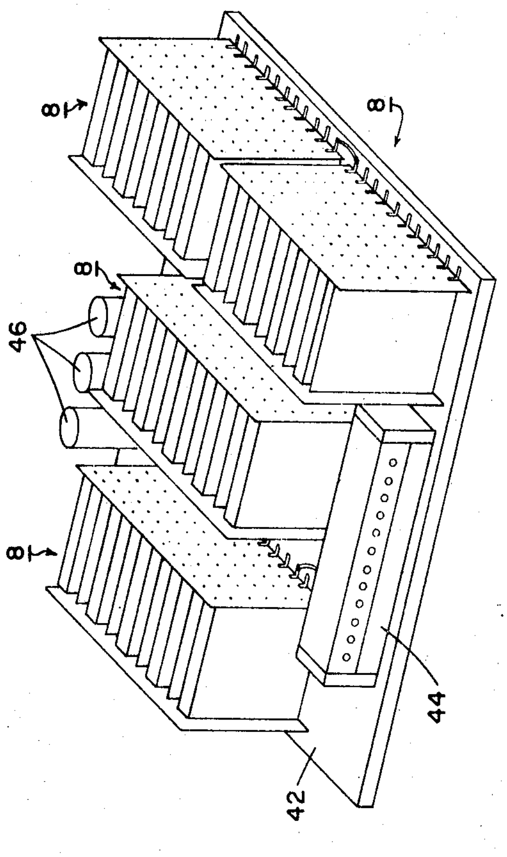
FIG. 4 is a perspective view of a circuit utilizing several modules of the type shown in FIG. 1.

Referring now to FIG. 4, it is seen that a plurality of modules 8 may be grouped together as modular building blocks in any desired configuration on a larger circuit board 42. The circuit board 42 would have a terminal block 44 for connecting it to a still larger assembly and may also contain a number of discrete components 46. In securing modules 8 to circuit boards 42, pins 16 and 18 may either be fitted into and soldered to plated-through holes in board 42 in a manner similar to the manner that flatpacks are secured to siderails or the pins may be bent and soldered to printed circuit wiring on the board as shown in FIG. 4. From FIG. 4 it is seen that the module 8 may be strung one behind the other to give a long skinny circuit configuration which may be packaged in a flat or tubular device such as a missile or rocket. The modules may also be stacked or strung out in a variety of other configurations.

Figure 5:
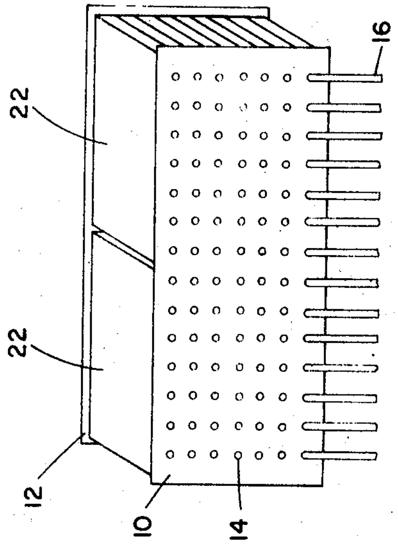
FIG. 5 is a perspective view of a packaging module of an alternative embodiment of the invention.

FIG. 5 shows an alternate configuration in which the flatpacks 22 may be arranged between circuit boards 10 and 12. In this figure, the spacing between holes in the horizontal direction on the boards 10 and 12 is equal to the spacing between pins on the flatpacks. The flatpacks are then stacked into horizontal arrays rather than being stacked vertically as in FIG. 1. In FIG. 5, universal interconnect wafers between flatpacks have not been shown although this would be just as feasible for the configuration of FIG. 5 as for the configuration of FIG. 1. One disadvantage of the almost 100% packing factor which is achieved with the array shown in FIG. 5 is that it severely restricts air flow through the module and therefore may result in an overheating problem. It has been found that if a packing factor much over 75% is attempted, heat dissipation becomes a problem. Since heat-sink plate 32 is a desirable but not essential feature of the packaging module, it has also been omitted from the embodiment of FIG. 5.

Figure 6:
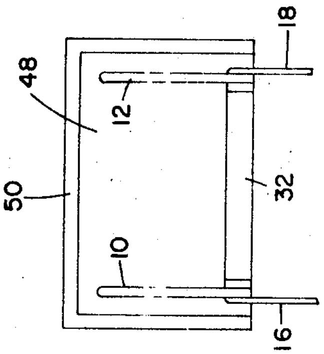
FIG. 6 is a front view of a modified embodiment of the packaging array of this invention.

FIG. 6 indicates another variation which may be employed with the flatpack packaging arrays of this invention. In this figure the entire module is shown encapsulated in a thermal potting compound 48 in order to protect the circuits and junctions from contamination and other environmental conditions. Since the thermal potting compound connects the flatpacks to heat-sink plate 32, the potting of the module eliminates the need for thermal adhesive layer 37 (FIG. 2). As an additional variation, an epoxy silver conductive compound 50 may be plated over the thermal potting compound 48 in order to electrically shield the module.

From the above it is apparent that a packaging array for flatpacks has been provided with has a potential packing factor up to 100%. The packing density may be controlled by varying the horizontal spacing between holes 14 (the vertical spacing in FIG. 5) and/or by modifying the mix and arrangement of flatpacks 22 and elements 28. The only real limiting factor on the packing density which may be achieved with this array is a requirement that there be a certain amount of heat dissipation. The higher packing density also results in shorter lead length which makes the circuit potentially faster and reduces the likelihood of crosstalk. An extremely flexible packing arrangement has also been described. Flatpacks or other active or passive circuit elements may be stacked in the modules in any one of a great variety of patterns, and, where a board 10 or 12 is larger than required for the number of flatpacks in the module, the excess board material may be trimmed to leave a module of the minimum required size. The modules themselves may be strung out or stacked in any one of a great variety of patterns to fit into variably shaped containers. The wiring on both sides of the board and the universal interconnect wafers have also eliminated the need for multi-layer printed circuit boards thus reducing the cost of the circuit array. Other cost savings, and improved circuit reliability, are achieved as a result of certain simplifications in fabrication which the arrays of this invention make possble. In order to more clearly point out these advantages, the manner in which the arrays of this invention are fabricated will now be briefly described.

ARRAY FABRICATION

Figure 8:
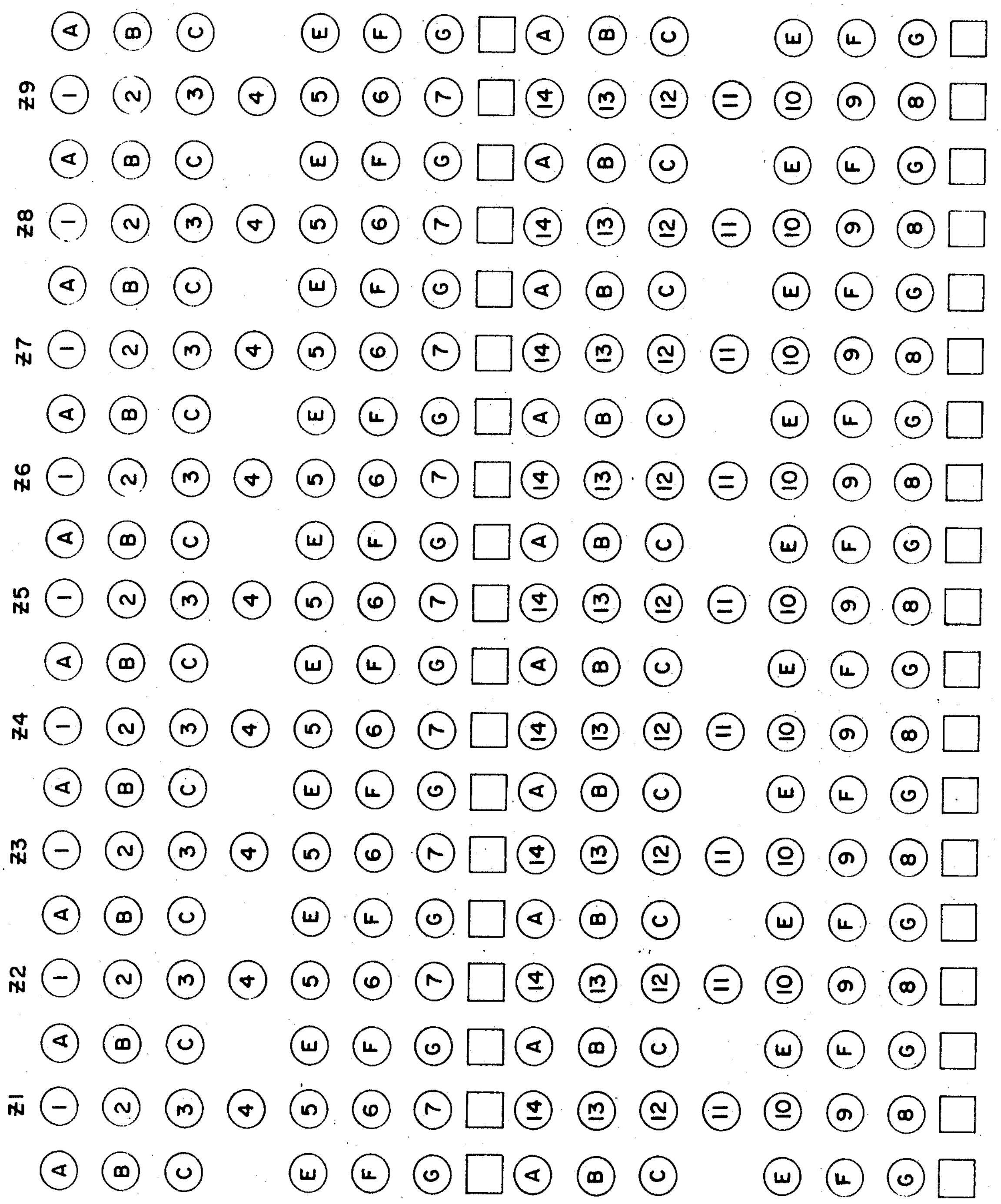
FIG. 8 is a diagram of a sheet which may be used to lay out the circuit board wiring for a packaging array of the type shown in FIG. 1.

In order to appreciate the manner in which the packaging technique of this invention simplifies the design procedure, the sequence of events which the prior art requires in order to get a final tape drawing for the wiring layout of the circuit boards will first be considered. This sequence normally starts with the logic designer turning over a schematic or logic diagram to a product design department where a printed circuit layout designer, usually a senior draftsman, lays out the required printed circuit board. When he finishes this layout, it goes back to the logic designer for checking, after which it is turned over to a tape draftsman, usually a junior draftsman, who makes the actual tape drawing. With the technique of this invention, universal master layouts for the siderails (see FIG. 8) are generated and used for all modues on a project. Using these, the logic designer can perform his own interconnection layout, using his judgment and experience to provide the optimum interconnections. His layout goes directly to the tapes draftsman, by-passing the senior draftsman. The tape draftsman also has a master siderail layout such as that shown in FIG. 8. These layouts are dimensionally stable Mylar and may, for example, have a 25 to 1 size ratio to the siderail itself. The layouts contain all the holes and pads. Thus the tape draftsman has only to place tape where it is shown on the logic designer's layout. It is thus seen that the services of one person, a senior draftsman, is eliminated in the circuit layout thus reducing both cost and the possibility of errors being introduced by an additional step in the operation. The standardized layouts also result in additional simplification both in the circuit design and in the taping operation.

Figure 7:
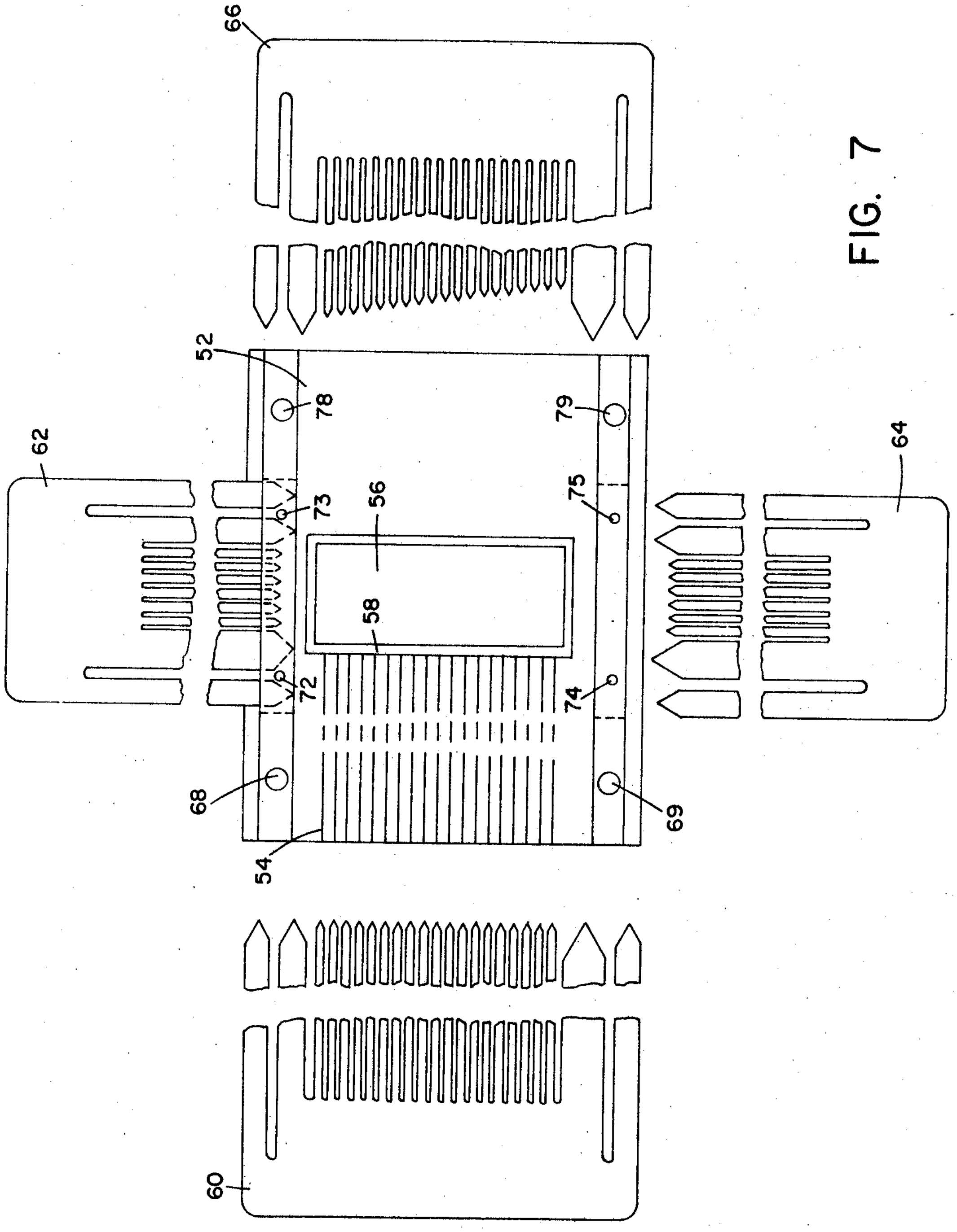
FIG. 7 is a top view of a tool suitable for use in the fabrication of a packaging array of the type shown in FIG. 1.

Once siderails having the desired wiring printed thereon have been generated, a tool of the type shown in FIG. 7 may be utilized to construct the final packaging array. The tool 52 is fabricated from stock aluminum material and consists of a bottom plate which has precision mill solts 54 for header wire attachment and a slot 56 having shoulders 58 on which a siderail may be supported during assembly. Precision chemically milled combs 60, 62, 64 and 66 are provided and utilized in a manner to be described shortly for pin alignment and to provide proper spacing between flatpacks and siderails.

The procedure for utilizing the tool of FIG. 7 to fabricate a module of the type shown in FIG. 1 is as follows:

(1) Place one of the siderails 10 or 12 into slot 56 of tool 52 with its edges resting on shoulder 58. The tolerances of the tool and siderail are such that this will assure proper positioning of the siderail.

(2) Attach wire ribbons 16 or 18 (.004 x .015 gold-plated Kovar) by inserting into plated-through holes, looping and soldering. Mill slots 54 are used for wire alignment.

(3) Extract the first siderail from the frame.

(4) Repeat steps 1 and 2 for the second siderail.

(5) Extract the second siderail from frame 52, rotate it 180° and reinsert it in the frame using milled slots 54 and header pins 16 or 18 to assist in obtaining proper alignment.

(6) Load the required number of flatpacks 22 and universal interconnect wafers 28' by inserting the pins of the flatpacks and wafers into the appropriate holes 14 in the siderail. A magnifying device may be required in order to permit the operator to properly perform this operation.

(7) Insert combs 60 and 62 between the flatpacks and the siderail. Pins 68, 69, 72 and 73 are used as guides to assure proper comb alignment. These combs provide a heat sink for the subsequent soldering operation and also provide the proper spacing between the flatpacks and the siderail. The combs also serve to lock the flatpacks and interconnect wafers in the proper position for later operations.

(8) Slide comb 64 onto guide pins 74 and 75 and, with tweezers, position flatpacks into proper comb slots. A stereoscope may be used in performing this operation. This assures that all pins on the flatpacks and interconnect wafers are properly aligned in one direction.

(9) Slide comb 66 over comb 64 using pins 78 and 79 as a guide and, with tweezers, position all leads to fit into the appropriate slots on this comb. Again a stereoscope may be used. Comb 66 is tapered to permit the leads to be aligned in this comb in a sequential fashion rather than having to align all leads at once.

In addition to properly aligning the leads for subsequent siderail insertion, combs 64 and 66 also serve as heat sinks for a subsequent soldering operation and serve to provide for proper spacing between the flatpacks and the upper siderail.

(10) Clip all leads projecting above comb 66 Christmas-tree style. As with comb 66, the staggering of the lead heights simplifies the subsequent siderail insertion operation.

(11) Install the upper siderail with the aid of tweezers and a microscope.

(12) Solder all leads projecting above the upper siderail to the printed circuit pattern. This provides for both mechanical and electrical connection of the siderail to the flatpacks and the interconnect wafers.

(13) Clip the excess leads flush to the rail.

(14) Rotate fixture 52 180°.

(15) Repeat steps 12 and 13 for what was the lower siderail. This results in the lower siderail being physically and electrically connected to the flatpacks and wafers.

(16) Extract all combs from the tool to release the module.

(17) Wash and brush the module in alcohol, dip the module in hydrogen scrubber, dip the module in a water rinse, and air-blast the module dry.

(18) Secure a heat-sink plate 32 to the module if desired and/or encapsulate the module in a thermal potting compound using standard potting techniques. A shielding layer 50 of conductive material may also be added at this time.

While the invention has been particularly shown and described with reference to preferred embodiments thereof, it will be understood by those skilled in the art that the foregoing and other changes in form and details may be made therein without the departing from the spirit and scope of the invention.

What is claimed is:

1. An electronic circuit module comprising:

first board means, second board means positioned parallel to said first board means and spaced a predetermined distance therefrom, each of said board means having a matrix of holes formed therein;

electrical conducting material plated through each of said holes;

an electrically conducting circuit pattern formed on at least one side of each of said boards, said patterns interconnecting the conducting material plated through selected ones of said holes;

a plurality of flat electronic circuit elements each of which has two faces and a plurality of electrical leads projecting from each of two opposite edges thereof, said circuit elements being positioned in at least one array with the faces of the elements parallel to each other between said board means with each lead on each edge of each element passing through a single hole in the adjacent board means;

means for physically and electrically connecting each lead to the conducting material plated through the corresponding hole; and passive circuit means physically positioned between at least selected ones of said circuit elements.

2. A module of the type described in claim 1 wherein said electronic circuit elements are flatpacks.

3. A module of the type described in claim 1 wherein said circuit means include means for interconnecting selected ones of the holes in said first and second board means.

4. A module of the type described in claim 3 wherein said passive circuit means are universal interconnect wafers.

5. A module of the type described in claim 1 wherein said passive circuit means are radiation shields of conducting material.

6. A module of the type described in claim 3 wherein said passive circuit means are printed circuit wafers each of which has at least one wire which, when the circuit means is connected in said module, electrically connects said first board to said second board.

7. A module of the type described in claim 6 wherein each of said wafers also includes at least one wire for connecting an upper hole on one of said boards to a lower hole.

8. A module of the type described in claim 1 wherein electrically conducting circuit patterns are formed on both sides of each of said boards, with the pattern on one side of a board being connected to the pattern on the other side by the electrical conducting material in at least one of said holes.

9. A module of the type described in claim 1 wherein the means for physically and electrically connecting each lead are solder fillets.

10. A module of the type described in claim 1 wherein said first and second boards are rectangular in shape; and wherein said circuit elements are oriented between said boords with their flat faces perpendicular to a plane formed by corresponding long edges of said boards.

11. A module of the type described in claim 1 wherein said first and second boards are rectangular in shape; and wherein said circuit elements are stacked between said board with their flat faces parallel to a plane formed by corresponding long edges of said boards.

12. A module of the type described in claim 11 wherein there are at least two adjacent stacks of said circuit elements in each module.

13. A module of the type described in claim 1 including means for encapsulating the entire module.

14. A module of the type described in claim 13 including a shield of conducting material formed over said encapsulating means.

15. A module of the type described in claim 1 including shield means covering the entire module.

References Cited

UNITED STATES PATENTS

| | | | |
|---|---|---|---|
| 2,862,992 | 12/1958 | Franz. | |
| 2,934,814 | 5/1960 | Williams et al. | |
| 3,370,351 | 2/1968 | Freehauf et al. | |
| 3,372,308 | 3/1968 | Noschese et al. | |
| 3,383,555 | 5/1968 | Gritton ____________ | 317—101 |
| 3,411,204 | 11/1968 | Reid ______________ | 174—68.5 |

FOREIGN PATENTS

| | | |
|---|---|---|
| 1,222,133 | 8/1966 | Germany. |

ROBERT K. SCHAEFER, Primary Examiner

J. R. SCOTT, Assistant Examiner

U.S. Cl. X.R.

174—68.5; 339—17